Oct. 22, 1946.  P. C. HEIJN  2,409,853
OPTICAL INSTRUMENT FOR EXAMINING POLARIZED LIGHT
Filed Jan. 21, 1943  4 Sheets-Sheet 1
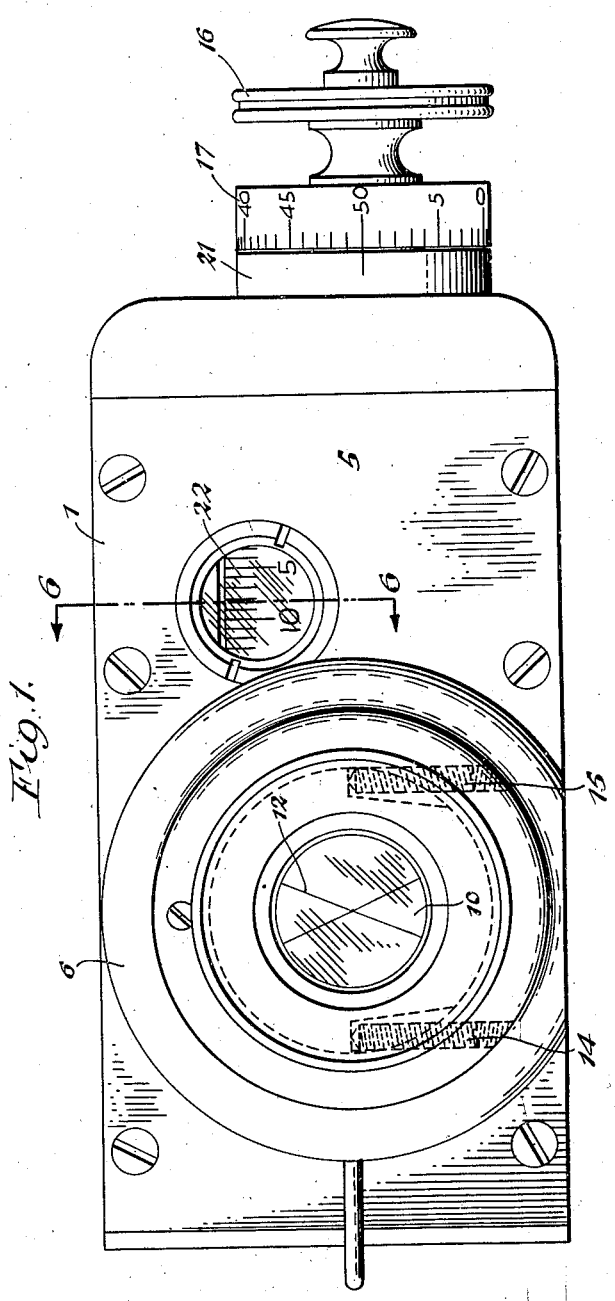
INVENTOR.
PAUL C. HEIJN
BY Raymond A. Paquin
ATTORNEY

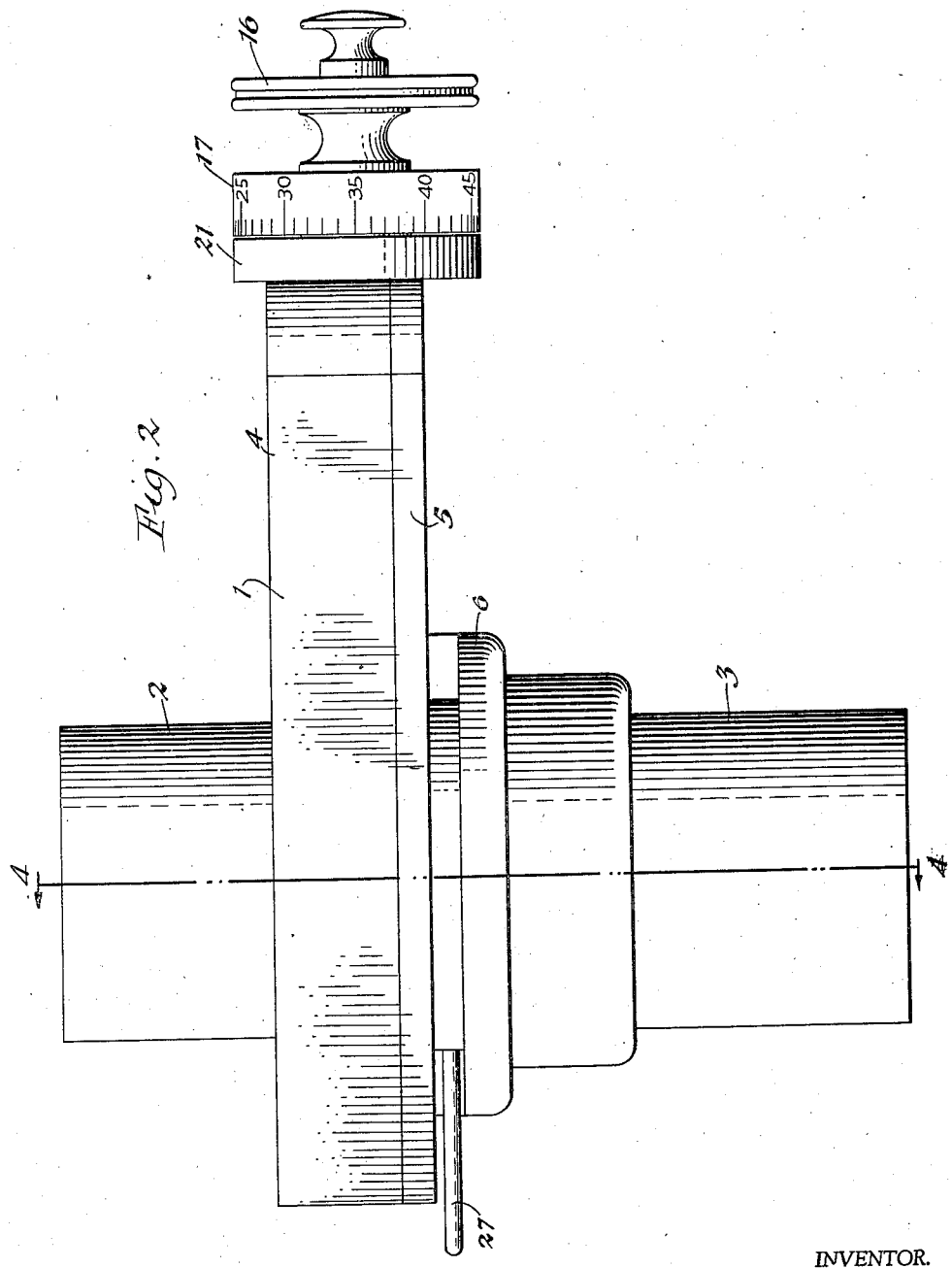

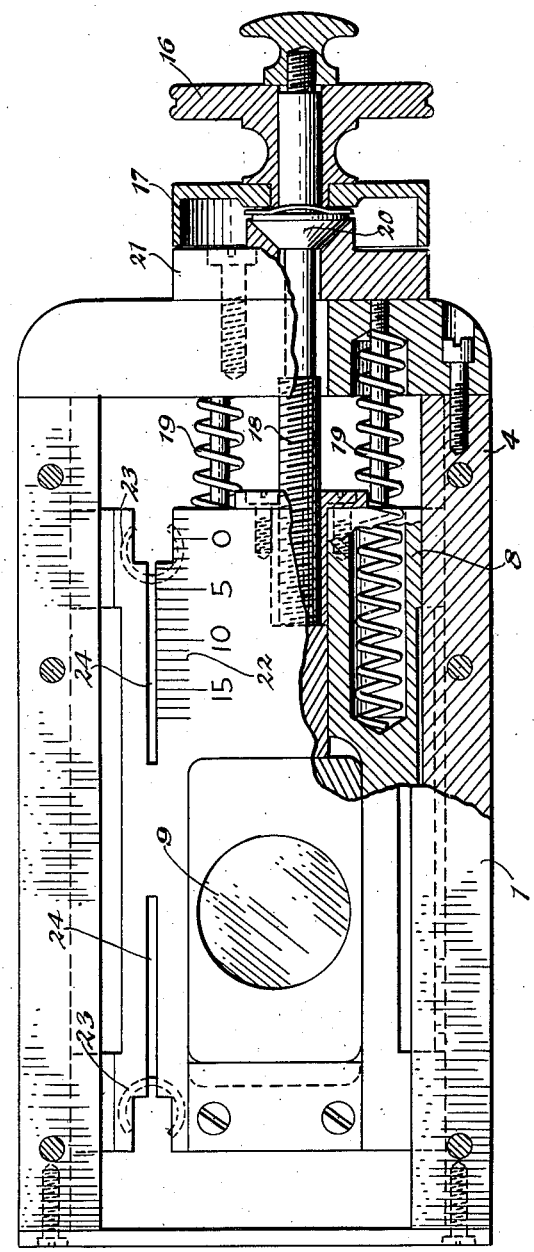

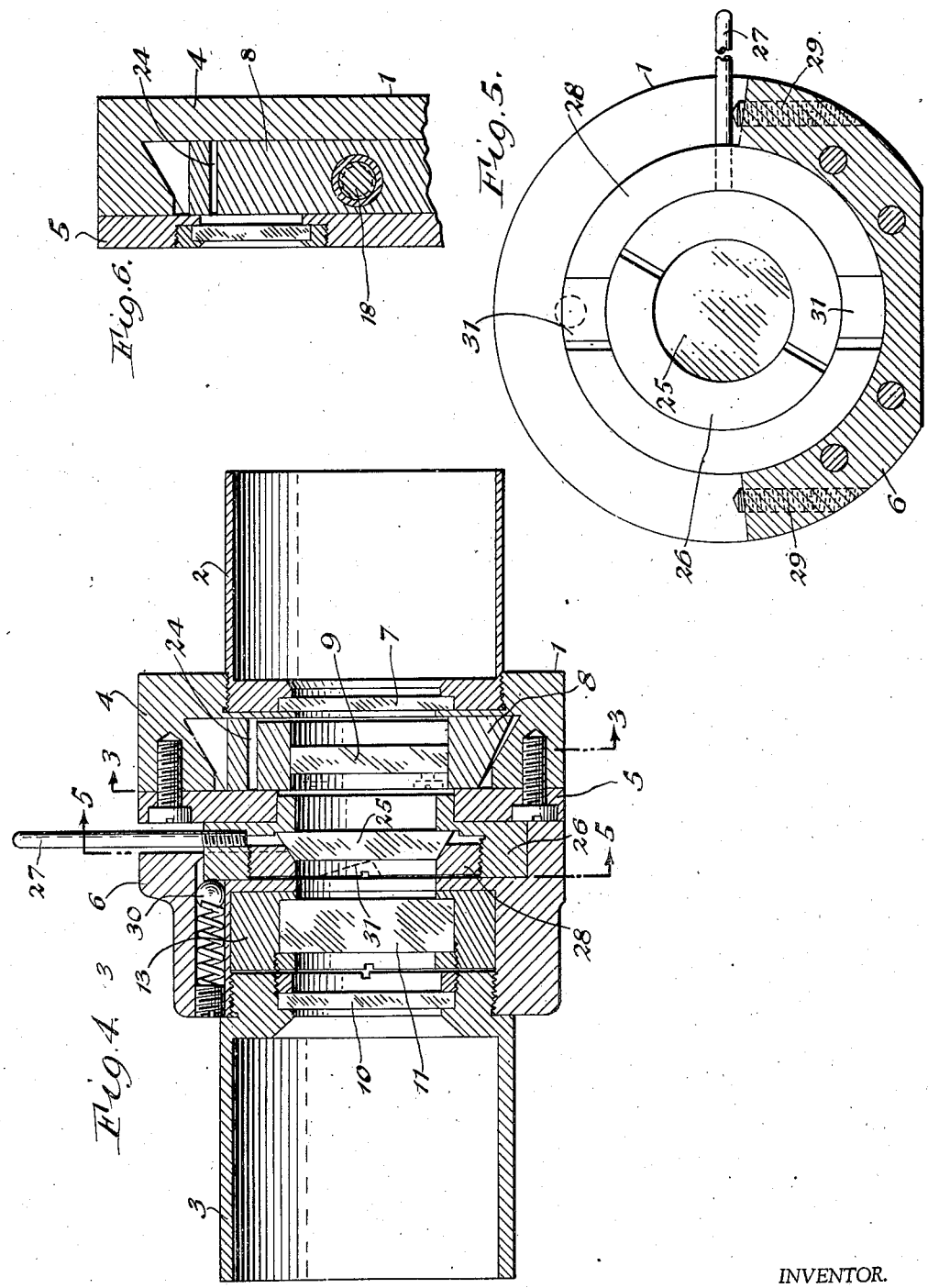

Patented Oct. 22, 1946

2,409,853

UNITED STATES PATENT OFFICE 2,409,853

OPTICAL INSTRUMENT FOR EXAMINING POLARIZED LIGHT

Paul C. Heijn, Buffalo, N. Y., assignor, by mesne assignments, to American Optical Company, Southbridge, Mass., a voluntary association Application January 21, 1943, Serial No. 473,086

3 Claims. (Cl. 88—14)

This invention relates to improvements in devices for analyzing and measuring elliptically polarized light, that is, for measuring the path difference between the two components of elliptically polarized light.

For the above purpose there has been provided in the past two devices. One of these devices was known as the Babinet compensator. Measurements with this type of device were confined to a narrow band or portion of the field. The other device was that known as the Soleil compensator or Babinet Soleil compensator. This latter form differed from the Babinet compensator in that it allowed measurement over a large field. Thus the above mentioned devices have particular advantages depending upon the nature of the particular measurement to be made.

In prior constructions it has been necessary to have each of the separate instruments available for use depending upon the particular measurement to be made. These devices were both very expensive and to be able to make various measurements it was necessary to have both instruments.

It, therefore, is the principal object of this invention to provide a new and improved device which is capable of employment for the uses of either a Babinet compensator or a Soleil compensator and therefore obviate the necessity and expense of having both such instruments.

Fig. 1 is a front view of a device embodying the invention;

Fig. 2 is a top or plan view thereof;

Fig. 3 is a sectional view taken along line 3—3 of Fig. 4 looking in the direction of the arrows;

Fig. 4 is a sectional view taken on line 4—4 of Fig. 2, looking in the direction of the arrows;

Fig. 5 is a sectional view taken on line 5—5 of Fig. 4, looking in the direction of the arrows; and Fig. 6 is a fragmentary sectional view taken on line 6—6 of Fig. 1, looking in the direction of the arrows.

Referring more particularly to the drawings wherein similar reference characters designate corresponding parts throughout the several views, the device embodying the invention comprises the instrument proper 1 to which is secured the mounting tube 2 to allow the device to be mounted in proper relation with an instrument with which it is to be used, such as a petrographic microscope, and the mounting tube 3 adapted to contain auxiliary optical elements such as Nicol prisms.

The instrument proper 1 comprises the slide body 4, cover plate 5 and cell 6.

The slide body 4 carries the mounting tube 2 in which is mounted the window 7 supported by the said mounting tube. In the slide body 4 is slidably mounted the sliding support or plate 8 adapted to support the sliding quartz wedge 9 and allow said wedge 9 to be moved to adjusted position as hereinafter described.

In the cell 6 is mounted the mounting tube 3 carrying the window 10. Also in this cell 6 is located the quartz plate 11. This plate 11 is a plane-parallel plate having its optical axis at right angles to the optical axis of the wedge 9.

On the window 10 is provided the cross hair or reticule 12, as shown in Fig. 1. This reticule or cross hair may be engraved upon said window 10 in the usual manner.

The plate 11 is mounted in an annular ring member 13, which member may be adjusted to adjust the optical axis so that said optical axis is at right angles with the optical axis of the wedge 9 by adjusting the adjusting screws 14 and 15 which are threaded into the cell 6 and have their extremities fitting into notched portions in said annular member 13 as shown in Fig. 1.

It will be seen that by loosening either of said screws 14 or 15 and tightening the other of said screws that said ring member 13 and plate 11 may be adjusted to line up the optical axis of said plate 11 as previously described.

As will be seen from Fig. 3 the mechanism for sliding the sliding wedge 9 comprises the hand wheel 16 carrying the graduated drum 17, said wheel being adapted to actuate the screw 18 which screw 18 is threaded into the sliding wedge support 8 and therefore causes said wedge support 8 and wedge 9 to move in either direction depending upon the direction of rotation of the wheel 16.

The coil springs 19 are provided to keep the conical bearing 20 in engagement with the bearing seat on the index disc 21 and also serve to take up any backlash in the screw 18.

The scale 22 which is engraved on the slide 8 indicates complete turns of the screw while the graduated drum 21 indicates fractional turns of the screw.

The C shaped springs 23 expand the slide 8 through the slits 24 in the slide 8 to expand the mount for the sliding wedge 9 to keep tension on the slide and take up any deviations in the sides of the slide.

Between the sliding wedge 9 and the plate 11 is provided another quartz wedge 25 which is mounted in the rotatable support 26 which support is adapted to be rotated by means of the handle member 27. Said wedge is retained in said support 26 by a retaining ring or the like 28.

The said wedge 25 is adapted to have its optical axis adjusted through 180 degrees by means of the rotatable support 26 and handle 27 described above.

In either adjusted position, said quartz wedge 25 has its optical axis aligned with the optical axis of the wedge 9 and at right angles to the optical axis of the plate 11.

To adjust the limiting positions of the optical axis of said wedge 25 there is provided the stop screws 29 shown in Fig. 5 which limit the movement of the handle 27 upon reaching each limiting position, thereby aligning the optical axis of said wedge 25 in either limiting position as described above.

To retain said wedge 25 in either adjusted position there is provided the spring pressed ball 30 adapted to enter a recess 31 in the adjacent face of the ring 26 when the handle has been pivoted to proper position to retain said wedge in said adjusted position.

When it is desired to employ the device as a Soleil compensator the wedge 25 is adjusted so that the direction of the wedge angle is opposite to the direction of the wedge angle of the wedge 9 so that the optical sum of the two wedges is that of a plate.

When it is desired to employ the device as a Babinet compensator the wedge 25 is adjusted so that the direction of the wedge angle is the same for both wedges. The optical sum of said wedges is that of a single wedge of twice the wedge angle of either wedge above. The air gap between the wedges does not appreciably affect the optical sum of said wedges and therefore can be disregarded. In contrast to a Babinet compensator which is made up of oppositely tapered quartz wedges, the present device will in the arrangement just described provide the combination of a quartz plate 11 and a two-part quartz wedge. Adjusting movement between the two parts 9 and 25 of this wedge (which is effected by rotation of screw 18 by hand wheel 16—see Fig. 3) brings about a change in phase which is due only to the transverse movement of the wedge 9. The other part 25 of this wedge is permanently positioned and therefore is constant. The sole movement of the wedge 9 has in this relation the equivalent function of a Babinet compensator.

From the foregoing it will be seen that I have provided simple, efficient and economical means for obtaining all of the objects and advantages of the invention.

Having described my invention, I claim:

1. In an instrument for use in examining polarized light, the combination of a plane-parallel plate of quartz and two quartz wedges disposed in series along the optical axis of the instrument for modifying light passing along said axis, the optical axes of said wedges being parallel with each other and perpendicular to the optical axis of said plate, said wedges being of minute angle, means for effecting relative movement between the wedges in the direction of variation in thickness to alter the length of the optical path through said wedges along the axis of the instrument, and means for effecting relative rotation between said wedges about the optical axis of the instrument through 180°.

2. In an instrument for use in examining polarized light, a bi-refringent retardation plate arranged with its faces normal to the optical axis of the instrument, two wedges of minute angle cooperating with said plate for modifying light passing along the axis of the instrument, each wedge being formed of bi-refringent retardation material and having its optical axis parallel to the optical axis of the other wedge and perpendicular to the optical axis of said retardation plate, means for effecting relative movement between said wedges in the direction of variation in thickness for altering the length of the optical path of light passing through said wedges along the optical axis of the instrument, and means for effecting relative rotation about the optical axis of the instrument between said wedges through 180°.

3. In an instrument for use in examining polarized light, a bi-refringent retardation plate arranged with its faces normal to the optical axis of the instrument, two members of birefringent retardation material cooperating with said plate for modifying the light passing along the axis of the instrument, each of the said members having a varying retardation effect along the length of said member, the variation of the retardation effect being at a relatively small and substantially uniform rate, each of said members having its optical axis parallel to the optical axis of the other of said members and perpendicular to the optical axis of said retardation plate, means for bodily shifting one of said members relative to the optical axis of the instrument in the direction of the length thereof for altering the length of the optical path of light passing through said members along the optical axis of the instrument, and means for effecting rotation of one of said members about the optical axis of the instrument through 180° relative to the other of said members.

PAUL C. HEIJN.